United States Patent [19]

Sawyer

[11] Patent Number: 5,884,172
[45] Date of Patent: Mar. 16, 1999

[54] LOCAL CONTROL ENHANCEMENT IN A TELECOMMUNICATIONS SYSTEMS

[75] Inventor: Francois Sawyer, St. Hubert, Canada

[73] Assignee: Telefonaktiebolaget L M Ericsson (publ), Stockholm, Sweden

[21] Appl. No.: 994,659

[22] Filed: Dec. 19, 1997

Related U.S. Application Data

[63] Continuation of Ser. No. 454,913, May 31, 1995, abandoned.

[51] Int. Cl.⁶ .................................................... H04Q 7/38
[52] U.S. Cl. .............................................................. 455/435
[58] Field of Search ................................... 455/435, 422, 455/403

[56] References Cited

U.S. PATENT DOCUMENTS

| | | |
|---|---|---|
| 5,260,988 | 11/1993 | Schellinger et al. . |
| 5,422,680 | 6/1995 | Schellinger et al. . |
| 5,463,675 | 10/1995 | Gerszberg et al. . |
| 5,475,735 | 12/1995 | Williams et al. . |
| 5,504,803 | 4/1996 | Yamada et al. . |
| 5,528,664 | 6/1996 | Slekys et al. . |
| 5,537,610 | 7/1996 | Mauger et al. . |
| 5,557,654 | 9/1996 | Maenpaa . |
| 5,588,042 | 12/1996 | Comer . |
| 5,594,780 | 1/1997 | Wiedeman et al. . |

Primary Examiner—William Cumming
Attorney, Agent, or Firm—Jenkens & Gilchrist, P.C.

[57] ABSTRACT

A method and system for providing support of local control functionality in a mobile telecommunications system independently of mobile station roaming status is provided. In the invention, upon receiving a registration access message a visited system accesses a database and determines whether the registering mobile station supports local control features supported by the system. If the mobile station and system support common local control features the system returns a local control registration confirmation message in place of the normal system registration confirmation message. The local control registration confirmation message confirms registration and also serves as an indication to the mobile station that the mobile station and system support common local control features. The mobile station and system may now function accordingly to allow use of the common local control features.

32 Claims, 10 Drawing Sheets

FIG. 5

| | Registration Access Message | | | Local Control Registration Confirmation Message | | | |
|---|---|---|---|---|---|---|---|
| Order Code | Order Qualification Code | Message Type | Function | Order Code | Order Qualification Code | Message Type | Function |
| 01101 | 010 | 00000 | Autonomous Registration- Do not make whereabouts known, Authentication Word C not included | 00111 | 000 | 00000 | Audit, indicates to mobile that common local control features are supported in system |
| 01101 | 011 | 00000 | Autonomous Registration- Make whereabouts known, Authentication Word C not included | 00111 | 000 | 00000 | Audit, indicates to mobile that common local control features are supported in system |
| 01101 | 011 | 00001 | Autonomous Registration- Power Down, Authentication Word C not included | 00111 | 000 | 00000 | Audit, indicates to mobile that common local control features are supported in system |
| 11000 | 010 | 00000 | Autonomous Registration- Do not make whereabouts known, Authentication Word C included | 00111 | 000 | 00000 | Audit, indicates to mobile that common local control features are supported in system |
| 11000 | 011 | 00000 | Autonomous Registration- Make whereabouts known, Authentication Word C included | 00111 | 000 | 00000 | Audit, indicates to mobile that common local control features are supported in system |
| 11000 | 011 | 00001 | Autonomous Registration- Power Down, Authentication Word C included | 00111 | 000 | 00000 | Audit, indicates to mobile that common local control features are supported in system |

FIG. 6

| Registration Access Message | | | Local Control Registration Confirmation Message | | |
|---|---|---|---|---|---|
| Order Code | Order Qualification Code | Function | Order Code | Order Qualification Code | Function |
| 01101 | 010 | Autonomous Registration- Do not make whereabouts known | 00111 | 000 | Audit, indicates to mobile that common local control features are supported in system |
| 01101 | 011 | Autonomous Registration- Make whereabouts known | 00111 | 000 | Audit, indicates to mobile that common local control features are supported in system |

FIG.8

| Class of Service Value | SID Values |
|---|---|
| LocalCtrlNotAvail (=0) | irrelevant |
| LocalCtrlAvailType1 (=1) | SID1, SID2, SID3, SID4 |
| LocalCtrlAvailType2 (=2) | SID5, SID6, SID7, SID8 |

LOCAL CONTROL ENHANCEMENT IN A TELECOMMUNICATIONS SYSTEMS

This application is a continuation of application Ser. No. 08/454,913, filed May 31, 1995 now abandoned.

BACKGROUND OF THE INVENTION

1. Technical Field of the Invention

This invention relates to mobile telecommunications systems, and more particularly, to a method and system which allows support of local control functionality in a mobile telecommunications system independent of mobile station roaming status.

2. History of the Prior Art

In a cellular telecommunications system the user of a mobile station communicates with the system through a radio interface while moving about the geographic coverage area of the system. The radio interface between the mobile station and system is implemented by providing base stations dispersed throughout the coverage area of the system, each capable of radio communications with the mobile stations operating within the system.

Existing cellular telecommunications systems operate according to various air interface standards which assure the compatibility of equipment designed to operate in a particular system. Examples of these standards include the EIA/TIA-553 Mobile Station-Land Station Compatibility Specification (AMPS), the IS-54-B Cellular System Dual-Mode Mobile Station-Base Station Compatibility Standard, and the EIA/TIA IS-136 Cellular System Dual-Mode Mobile Station-Base Station Compatibility Standard. Each of these standards provides specific details of the processes that take place in the mobile stations and base stations of a system in all modes of operation, including during its idle state, during rescanning of control channels, during registration, and during connection to voice or traffic channels. Each standard contains a very comprehensive level of detail regarding the operation of mobile stations and base stations. This comprehensive level of detail ensures that end-user equipment built according to a particular standard will be able to operate properly with any cellular system equipment also complying with the same standard.

The major cellular telecommunication systems standards are commonly established through consensus among the responsible government agencies and various members of the cellular industry. Cellular system vendors, cellular mobile station manufacturers and cellular network operators all have input into establishing the rules for interoperability of cellular systems and end-user equipment. The development of cellular standards is generally a slow process. The final standard will generally be of high quality, but will nevertheless be a compromise between the various solutions preferred by the different members of the cellular industry.

In a cellular system, each separate geographic area or cell of the system is illuminated by the radio transmissions from the base station which covers that cell and which is in turn coupled to a mobile switching center ("MSC"). The MSC controls the radio linkages between many different base stations and their associated cells. Each cellular system is made up of one or more MSCs and its associated base stations. A mobile station is typically assigned one system as its home system. When a mobile station travels from the geographic area covered by its home MSC, or the group of MSCs forming its home system, it is said to be "roaming".

A cellular phone system tracks the location of a roaming mobile station through the process of registration. In registration, a mobile station transmits a registration request message on the control channel of the base station nearest to its location. The base station will transmit a registration confirmation message back to the mobile station on the control channel if the registration request is accepted. This confirmation message confirms that the system in which the receiving base station is located has registered the mobile station in the system location area which that base station serves. A cellular system can be made up of one or more system location areas, and a system location area can be served by one or more base stations. The registration process can be either periodic or location-based.

Periodic registration occurs independently without mobile station user action, and is done periodically at predefined time intervals. The system periodically transmits certain parameters to mobile stations on the control channel of the base stations serving the cells in which the mobile stations happen to be located. The mobile stations then transmit registration request messages to the system, as they move about the system, at time periods calculated according to these parameters. A registration access message is received by the system at the base station serving the cell in which a particular mobile station is located at the time of transmission of the registration access. Upon receipt of the registration access message, the system registers that particular mobile station in the system location area containing the cell of the base station which received the registration access. After the mobile station has been registered the base station then transmits a registration confirmation message back to the mobile station.

Location-based registration occurs as a result of a mobile unit moving from one system location area to another or from one system to another. A base station will periodically transmit system location identifying data in an Overhead Message Train (OMT) on its control channel. The location identifying data includes a system identification value (SID, in EIA/TIA-553, IS-54-B or IS-136) which identifies the system in which the base station is located. In IS-54-B and IS-136 the location identifying data also includes a location area identification (LOCAID) which may identify a particular subdivision within a system. A mobile station periodically scans these base station control channels as it moves throughout the system or systems and receives the location identifying data for the system and/or system location area in which it is located. The mobile station compares the latest received location identifying data with data in its memory identifying the last system and/or system location area in which it received a registration confirmation message. If the two sets of identifying data match, the mobile is located in the system and/or system location area in which it is registered. If the mobile station has moved, and, the sets of data don't match, the mobile will transmit a registration access message which is received at the base station serving a cell contained in the system and/or system location area in which it is now located. The system will then register the mobile station in this new system and/or system location area and send a registration confirmation back to the mobile station. If a system is subdivided into system location areas, the new system location area may be in the same system in which the mobile was previously registered or in a different system.

Existing standards commonly allow for customization of the air interface to provide special local services within a system. Customization of the air interface may be used to provide additional services that are not implemented into a standard due to the lengthy standardization process, or that have been chosen not to be implemented to all, or that may be implemented according to parameters that are not the preferred choice of some cellular equipment manufacturers or operators. The standards define certain message codes that identify messages as local control messages. The content and use of these messages are not defined by the standards and are left to the discretion of mobile station and system equipment manufacturers. The local control feature of a system can be used to implement a mode of operation not defined in the system standard. Special services can be provided in this way.

The EIA/TIA-553, IS-54-B, and IS-136 standards all set some restrictions on the use of the local control services. Local control messages can be interpreted and acted upon by a mobile station only when the local control option is enabled by software in the mobile station. The provision of a software means to turn on or off the local control mode in the mobile station is mandated by each standard. In addition, the nature of the roaming feature provided by cellular systems inherently restricts the use of local control.

For local control purposes, the standards require a mobile station to compare the group identification of the SID received on the OMT of the control channel with a group identification of a Home SID permanently stored in the mobile, each time the mobile station registers in a new system. The group identification is comprised of a specified number of the most significant bits of the SID. Only if the bits of the Home SID that comprise the group identification match the group identification in the received and stored SID, will the local control function be enabled and local control messages be acted upon by the mobile. For this reason a mobile station must operate in a system location area within a system with a group identification the same as the group identification of its home system, or home area, to benefit from the use of local control. When a mobile station is not operating in a system or area which is part of the group identification, all benefits of local control are lost.

SID values for cellular systems have generally been set without regard of the possibility of using the group identification for local control purposes. In many cases, two cellular systems owned by the same cellular operator and providing service to two closely proximated cities will not have SID values with the same group identification. A mobile subscriber may roam between a mobile station's Home System and a nearby system and not be able to benefit from common local control features in the Home System and the nearby system, since roaming status is acquired within a short distance of the Home system or Home area.

Another problem with local control is that mobile stations are made by many different manufacturers. There may be no consistency as to which manufacturers build mobile stations that support local control functions that are implemented in a certain system.

In practice, given the multiplicity of cellular systems, the high mobility of many mobile stations which may roam between cities served by different systems, and the large number of mobile station manufacturers, the possibility of using local control is very restricted. Because of this, local control is rarely used.

It would be a distinct advantage then, to have a method and system which would allow a determination to be made as to whether roaming mobile stations can operate according to local control feature functions offered in a visited system. This would allow the mobile station user to take advantage of benefits offered by the local control features of the visited systems as the user moves from system to system.

SUMMARY OF THE INVENTION

The present invention provides a method and system for use during the registration of mobile stations which allows support of local control features in a newly accessed system, independent of roaming status. Accordingly, it is not necessary that a newly accessed system's system identification contain the same group identification as is contained in the mobile station's home system identification in order to make use of the local control function. During mobile station registration a determination is made in the newly accessed system as to whether or not a registering mobile station can operate according to local control features supported by the newly accessed system. The determination is made by comparing data received from the mobile station during registration with data obtained by accessing a data base within the newly accessed system. If it is determined that a registering mobile station can operate according to local control features supported by the system, the system sends a signal to the mobile station that contains an indication of local control compatibility. The mobile station and base station may then both function accordingly be to and allow use of the local control features.

In one aspect of the invention, a registration message comprising first and second identification codes is received by the system from a mobile station. The system then determines if the first identification code is contained in a list stored within a data base of the system. If the first identification code is not contained within the list, this serves as an indication to the system that the mobile station and system do not support common local control features. In this case, the system transmits a first type message to the mobile station. The first type message confirms registration but does not authorize mobile station use of local control features. If the first identification code is contained within the list, the system then checks to determine if the value of the second identification code is within a range of numbers associated with the first identification code and stored within the list. If the second identification code is not within the range, this serves as an indication to the system that the mobile station and system do not support common local control features. In this case, the system transmits the first type message to the mobile station. If the second identification code is within the range this serves as an indication to the system that the mobile station and system support common local control features. In this case, the system transmits a second type message to the mobile station confirming registration and indicating to the mobile station that the mobile station and system support common local control features.

In a second aspect of the invention, after a mobile station is registered in a system, the system accesses local control class of service data stored within the home location register of the mobile station. The system then determines if the class of service data indicates that the mobile station supports local control features supported in the system. If the class of service data indicates that the mobile station supports local control features supported in the system, the system will then check a group flag contained within the class of service data. The group flag indicates whether the mobile station has registered in a common local control group to which the system belongs. If the group flag indicates that the mobile station has not previously registered in a system of the common local control group, the system sets the flag, pages the mobile station and assigns a voice channel for communications between the system and mobile station. The system then transmits a local control message to the mobile station on the voice channel. The local control message serves as an indication to the mobile station that the mobile station and system support common local control features. The local control message also contains a data field containing system identification values identifying systems belonging to a common local control group. The mobile station may then roam within these systems while having an indication that each system supports the common local control features.

In a further aspect of the invention, upon receiving a registration access message from a mobile station, a system accesses local control class of service data stored within the home location register of the mobile station. If the class of service data indicates that the mobile station supports local control features supported by the system and if a group flag indicates that the mobile station has not previously registered in a common local control group supporting the local control features, the system transmits a voice channel assignment message as a local control registration confirmation message. Along with confirming registration, the voice channel assignment message serves as an indication to the mobile station that the system and mobile station support common local control features. The system then transmits a local control message on the assigned voice channel. The local control message contains a data field containing system identification values identifying to a common local control group. The mobile station may then roam within these systems while having an indication that each system supports common local control features.

BRIEF DESCRIPTION OF THE DRAWINGS

For a more complete understanding of the present invention and for further objects and advantages thereof, reference may now be had to the following description taken in conjunction with the accompanying drawings in which:

FIGS. 5 and 6 illustrate possible sequences of registration accesses and special local control registration confirmation messages according to a first embodiment of the invention;

FIG. 8 illustrates local control class of service values stored in a subscriber profile according to a second embodiment of the invention;

DETAILED DESCRIPTION OF THE INVENTION

Figure 1:
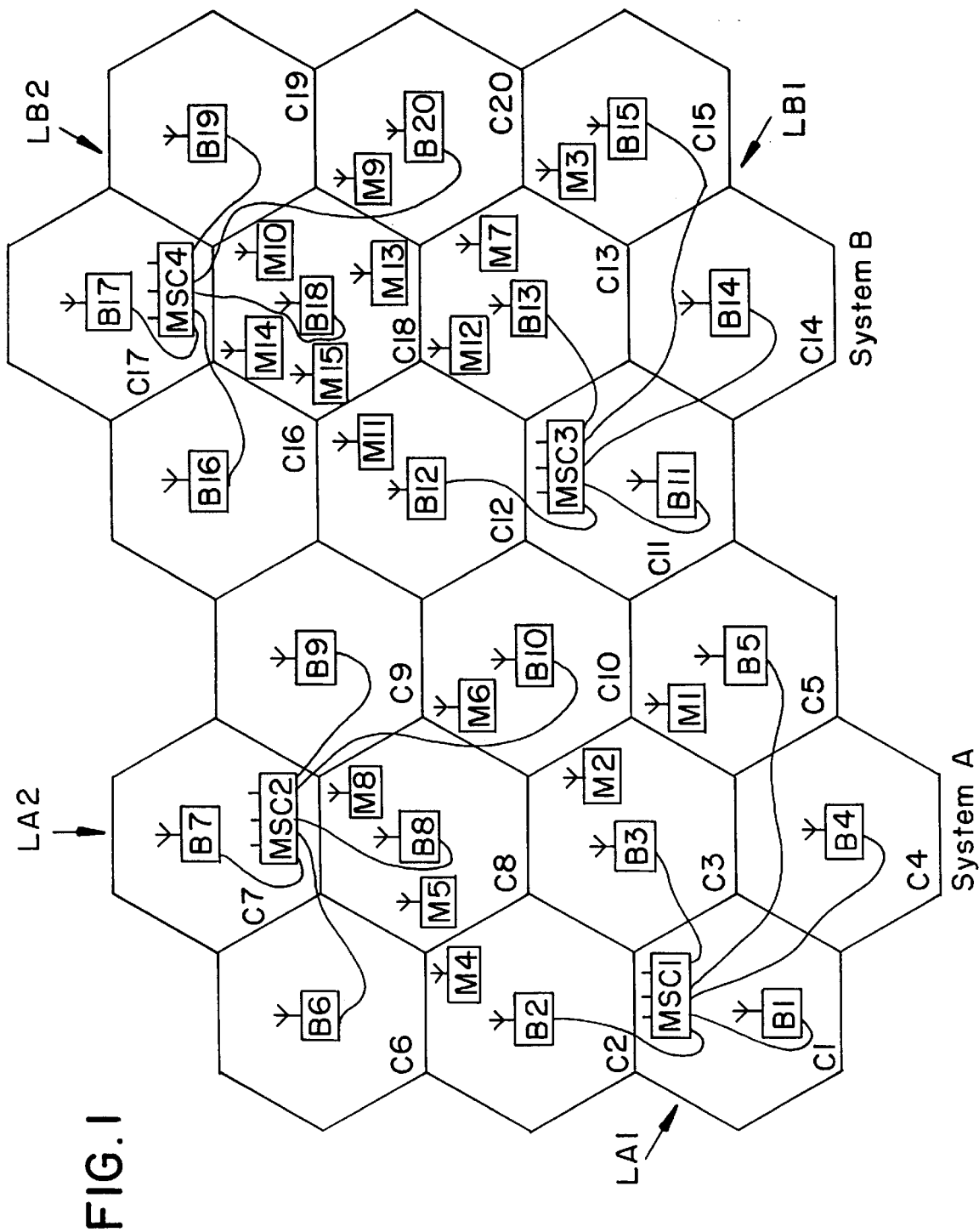
FIG. 1 illustrates a cellular mobile telecommunications system within which the present invention may be implemented.

Referring to FIG. 1, there is illustrated a conventional cellular radio communication network, containing two systems, A and B, of the type to which the present invention generally pertains. In FIG. 1, the geographic area of systems A and B may be divided into a plurality of contiguous radio coverage areas, or cells C1–C10 and C11–C20, respectively. System A is divided into system location area LA1 containing cells C1–C5 and system location area LA2, containing cells C6–C10. System B is divided into system location area LB1, containing cells B11–B15, and system location area LB2, containing cells B16–B20. While the systems of FIG. 1 are illustratively shown to include only 10 cells each, it should be clearly understood that in practice, the number of cells in a system could be much larger.

Associated with and located within each of the cells C1–C20 of FIG. 1 is a base station designated as a corresponding one of a plurality of base stations B1–B20. Each of the base stations B1–B20 includes a transmitter, a receiver, and a base station controller as are well known in the art. In FIG. 1, the base stations B1–B20 are illustratively located at the center of each of the cells C1–C20, respectively, and are equipped with omni-directional antennas. However, in other configurations of the cellular radio systems, the base stations B1–B20 may be located near the periphery, or otherwise away from the center of the cells C1–C20 and may illuminate the cells C1–C20 with radio signals either omni-directionally or directionally. Therefore, the representation of the cellular radio systems of FIG. 1 is for purposes of illustration only and is not intended as a limitation on the possible implementations of the cellular radio system within which the present invention is implemented.

With continuing reference to FIG. 1, a plurality of mobile stations M1–M15 may be found within the cells C1–C10, of system A and cells C11–C20 of system B. Each of the mobile stations M1–M15 includes a transmitter, a receiver, and a mobile station controller as are well known in the art. Although, only 15 mobile stations are shown in FIG. 1, it should be understood that the actual number of mobile stations will be much larger in practice and will invariably greatly exceed the number of base stations. Moreover, while none of the mobile stations M1–M15 may be found in some of the cells C1–C20, the presence or absence of the mobile stations M1–M15 in any particular one of the cells C1–C20 should be understood to depend in practice on the individual desires of the users of the mobile stations M1–M15 who may roam from one location in the cell to another or from one cell to an adjacent cell or neighboring cell, and even from system A to system B.

Each of the mobile stations M1–M15 is capable of initiating or receiving a telephone call through one or more of the base stations B1–B20 and a mobile station switching center MSC1-MSC4 which is connected to the base station. MSC1 is connected to base stations B1–B5, MSC2 is connected to base stations B6–B10, MSC is connected to base stations B11–B15, and MSC4 is connected to base stations B16–B20. Each MSC is connected to the fixed public switched telephone network PSTN, not shown, or a similar fixed network which may include an integrated services digital network (ISDN) facility.

Each mobile station M1–M15 is assigned a home system that may be system A, system B, or another system that is not shown. A home location register (HLR)(not shown) for each mobile station M1–M15 is maintained in the home system of each mobile station M1–M15. The HLR contains a subscriber profile that contains location and other relevant data for use when an incoming call is received to the home system from the cellular network itself, the PSTN, the ISDN or another similar fixed network. The incoming call can then be transferred to the visited system in which the mobile station is registered. The HLR may be physically located in the MSC of the home system or in another suitable location of the home system.

In FIG. 1, MSC1 and MSC2 control system location areas LA1 and LA2, respectively, of system A, and MSC3 and MSC4 control system location areas LB1 and LB2 of System B. Each of MSC1–MSC4 may control the administration of communication between the particular base stations of B1–B20 connected to it, and the mobile stations M1–M15 in communication with it at the time. The relevant connections between the mobile station switching centers MSC1–MSC4 and the base stations B1–B20, or between the mobile station switching centers MSC1–MSC4 and the PSTN or ISDN, are not completely shown in FIG. 1 but are well known to those of ordinary skill in the art. Data stored within the HLR will typically be accessed by a visited system when a mobile station roams between systems. As a mobile station roams about and between the system A and system B, the mobile station registers its location with the system through the base station and its associated MSC with which the mobile station is communicating. The system then registers the mobile station in the system location area and system in which the mobile station is located. When the system receives a call addressed to a particular mobile station, a paging message addressed to that mobile station is broadcast on control channels of the base stations which serve the cells in the system and system location area in which the mobile station is believed to be located. Each MSC1–MSC4 controls the paging of a mobile station believed to be in the geographic area served by the base stations located within the system location area controlled by the MSC.

Upon receiving the paging message addressed to it, the mobile station scans system access channels and sends a page response to the base station from which it received the strongest access channel signal. The process is then initiated to create the call connection. The assignment of radio channels to a mobile station by a base station upon receipt of a page response from the mobile station, as well as the handoff communications with a mobile station from one base station to another in response to the mobile station traveling through the system, from cell to cell, while communication is in progress are controlled by MSC1–MSC4.

Each of the cells C1–C20 is allocated a plurality of voice or speech channels and at least one control channel, such as a control channel comprising a forward control channel (FOCC) and a reverse control channel (RECC). The control channel is used to control or supervise the operation of mobile stations by means of information transmitted to and received from those units. Such information may include incoming call signals, outgoing call signals, page signals, page response signals, location registration signals and voice channel assignments.

Figure 2:
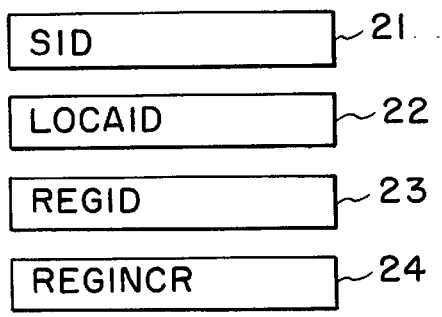
FIG. 2 is a diagrammatic illustration of a subset of the Overhead Message Train information sent by a base station to a mobile station.

In a preferred embodiment, the invention is implemented into cellular systems of the type shown in FIG. 1 in which the analog control channel operates according to the EIA/TIA-553, IS-54, or IS-136 standards during registration. These standards are hereby incorporated by reference. The analog control channel of each of these systems operates in a similar manner. The mobile station registration process is controlled by the MSC by means of data sent to the mobile station by its fixed radio base stations on their FOCC as part of an Overhead Message Train (OMT). Such data is illustrated in FIG. 2 and includes the system identification number (SID) 21, the location area identification number (LOCAID) 22, the registration identification number (REGID) 23, and the registration increment parameter (REGINCR) 24. The SID 21 and the LOCAID 22 are used to define the particular mobile system (SID) or its location areas (LOCAID), which are defined for purposes of increasing the efficiency of location of mobile stations within the system. The EIA/TIA-553 system does not utilize a LOCAID value. A particular system as defined by an SID may form part of a MSC's service area and, in some cases, more than one MSC service area will form a system as defined and specified by a particular SID. A LOCAID may then be used to identify MSC borders independently of SID borders. This is the case with the systems shown in FIG. 1, where system A is made up of location areas LA1 and LA2, and system B is made up of location areas LB1 and LB2. The REGID acts as a clock within the system for periodic registration while the REGINCR is an indication for the mobile station of the periodicity of the registration process. Mobile stations are instructed by the system to register upon detection of a new system or any part thereof based upon the data transmitted to it over the FOCC. That is, a mobile station must register upon the detection of a new SID or a new LOCAID forming part of the data in the OMT received on its FOCC. Mobile stations are also instructed to register periodically, according to the parameters set forth within the REGID 23 and REGINCR 24 portions of the OMT received by it on the control channel. These parameters are set forth in the OMT data diagram shown in FIG. 2.

Figure 3:
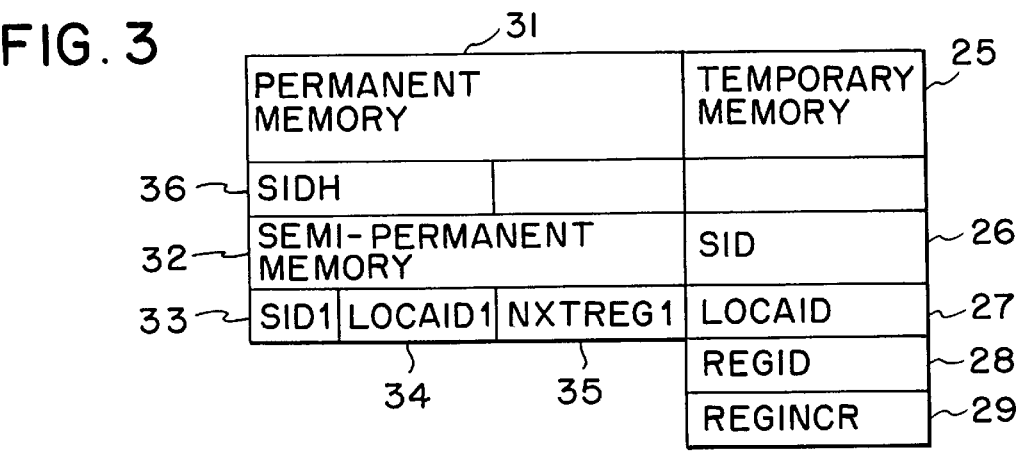
FIG. 3 is a chart illustrating registration parameters stored within the memory of a mobile station.

FIG. 3 is a chart illustrating registration parameters stored within the memory of a mobile station. When a mobile station determines that it should register with the system, it stores temporarily within its memory 25 the SID 26, LOCAID 27 (in IS-54-B and IS-136), REGID 28, and REGINCR 29 values received by it on the OMT on the FOCCs it is receiving. It then rescans the available control channels to choose the best channel available to it, this being determined as the control channel with the highest detected signal strength received by the mobile.

A registration access message is then sent by the mobile station on a reverse control channel (RECC) and is received by the fixed radio base station. The registration access message includes an order code field, order qualifier code field, message type field, a mobile identification number (MIN), and an electronic serial number (ESN). The EIA/TIA-553 system does not utilize the message type field. The 5-bit order code, 3-bit order qualifier code, and 5-bit message type fields identify the type of message. The 34-bit MIN is a number derived from the mobile stations 10-digit telephone number. The 32-bit ESN is a factory set number that uniquely identifies the mobile station to any system. The ESN consists of 8-bit manufacturer's code (MFR code) contained within the eight most significant bits (24 through 31) of the ESN, and a 17-bit serial number (SN) contained within the seventeen least significant bits (0 through 17) of the ESN. Bits 18 through 23 of the ESN are used for future allocation of additional serial numbers to a particular manufacturer when bits 0 through 17 are used up.

The base station transfers the information received in the registration access message to the MSC with which it is associated, and the MSC informs the HLR of the mobile station of the current location of the mobile station. The MSC also instructs the base station to send a registration confirmation to the mobile station indicating that it has been registered within the system. The registration confirmation message is defined in the system specifications as containing the same order code, order qualifying code and/or message type fields as the registration access message. Each mobile station has a semi-permanent memory 31 which contains entries 33 and 34, that indicates the cellular system in which the mobile most recently registered, along with an associated NXTREG 35. Each mobile station also has a permanent memory 32 which contains the SIDH 36 of the home system.

Upon receiving a registration confirmation message with the same order code, order qualifier code, and/or message type fields from the newly accessed system, the mobile station stores within its semi-permanent memory 31 either the LOCAID and/or the SID depending on which is a new value. In the event a new SID is stored, a next registration (NXTREG) parameter is computed from the REGID and the REGINCR parameters received along with the new SID and thereafter stored in the semi-permanent memory 31. The mobile station then again rescans the control channels to ensure that it is operating on the control channel with the highest possible signal strength then available to it.

The present invention involves modifications to the registration process described above. In a first embodiment of the invention a manufacturer's code (MFR Code) and a serial number range, or ranges, associated with the MFR code is stored in a local control list in each system in which the invention is implemented. The local control list may be stored either in a single MSC or in Multiple MSCs of the system. The MFR code local control list contains the 8-bit MFR code for each mobile station manufacturer who manufactures mobile stations which support the local control features offered by the system. This MFR code will be identical to the MFR code contained in the ESNs of mobile stations made by each of those manufacturers. Along with the MFR code, an associated serial number range is also stored. This serial number range indicates which particular mobile stations of the manufacturer support the local control features.

Figure 4:
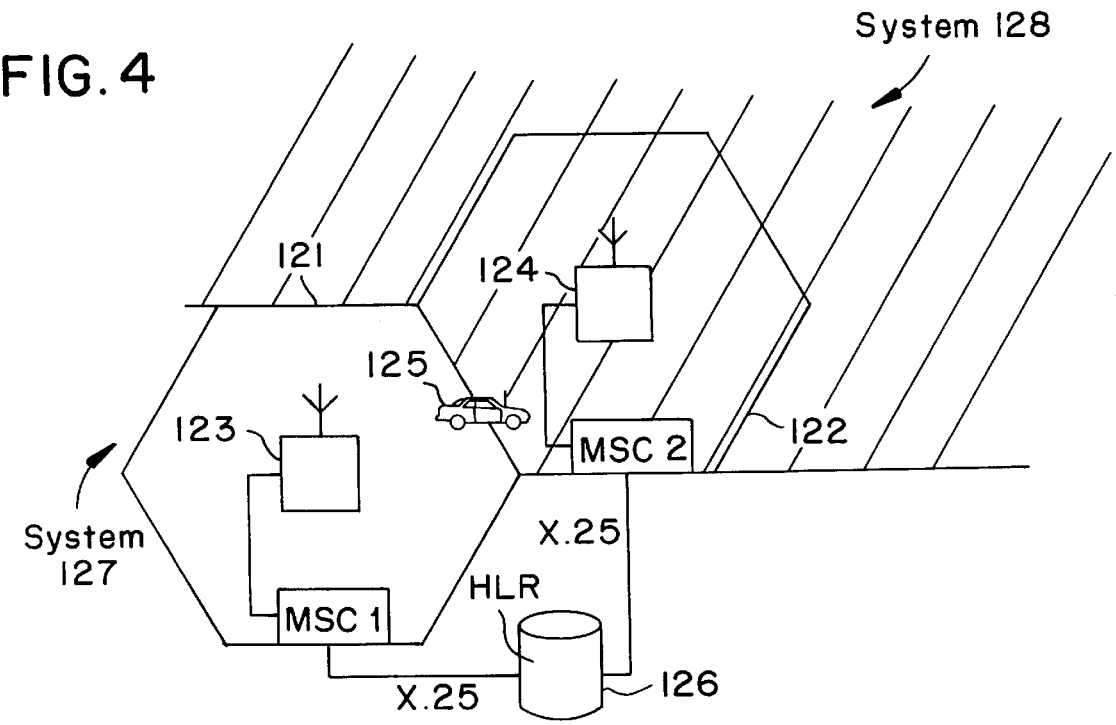
FIG. 4 is a block diagram illustrating the operation of a mobile station within the area bordering two adjacent cellular systems.

In FIG. 4, there is shown an illustrative diagram illustrating two cells or service areas 121 and 122 each controlled by MSC1 and MSC2, respectively. Service area 121 is part of system 127 and service area 122 is part of system 128 (shown by shaded area). The complete systems 127 and 128 are not shown. They may be systems configured such as systems A and B of FIG. 1. The invention is implemented in each of systems 127 and 128. For purposes of illustration only IS-54-B and IS-136 parameters will be referenced. The invention has equal applicability to other similar systems. For example, the implementation in an EIA/TIA-553 system would be similar except the LOCAID values on the OMT, and the message type codes in the registration messages would not be used.

Within the service area 121 served by MSC1, there is illustrated a base station 123 broadcasting control parameters on the OMT of its FOCC. These include the parameters SID1, LOCAID1, REGID1, and REGINCR1. Similarly, service area 122 served by MSC2 includes a base station 124 which is broadcasting certain system parameters on its FOCC. These parameters include SID2, LOCAID2, REGID2, and REGINCR2. Mobile station 125 is shown to be operating in the border region between the two service areas 121 and 122. Neither system 127 or 128 is the home system of mobile station 125, and neither has a group identification the same as the group identification contained in the SID of the home system of mobile station 125. Mobile station 125 stores within its memory a set of system parameters which are being received periodically on the OMT of the FOCC to which it is currently tuned. The location data for the mobile station 125 is stored in the home HLR 126 of mobile station 125, the data including the identity of the MSC within which the mobile station is currently registered. The HLR 126 receives data from both MSC1 and MSC2 via signaling links operating for instance over Signaling System number 7 protocols or X.25 protocols depending on the particular circumstances.

The mobile station 125 listens to the FOCC which has the highest measured signal strength as of its last rescan of the available channels. Radio propagation characteristics are such that the mobile station 125 may frequently change its tuning from one FOCC to another depending upon signal quality of the channels it is receiving. The mobile station 125 regularly detects system parameters broadcast in the OMTs of the FOCCs which it is tuned to. The mobile station 125 will decide to register if any one of the following conditions exist:

(a) SID(stored) is≠SID (received); or
(b) LOCAID(stored) is≠LOCAID(received); or
(c) NXTREG (stored)<REGID (received). That is, the mobile station is constantly storing in its temporary memory values of the registration parameters received on the OMT of the FOCC it is currently tuned to, it compares those values with the values stored in its semi-permanent memory so that it can then determine whether or not it is appropriate to reregister based upon both location parameters and time parameters. When mobile station 125 enters service area 122 of system 128 from service area 121 of system 127, it will receive SID2, LOCAID2, REGID2 and REGINCR2 on the OMT of the FOCC of base station 124. Since SID2 is not equal to SID1, the mobile station 125 will decide to register in the system location area 122 of the newly accessed system 128.

After mobile station 125 decides to register and before it sends its registration access message on the RECC of base station 124 which it is then currently tuned to, the mobile station rescans and selects a FOCC of the same base station 124. It may be the same FOCC it was just receiving or a FOCCs depending upon the quality of the signal being broadcast on the different FOCC available to it at the time it rescans. The registration access message sent by the mobile station is sent on the RECC associated with new FOCC which it tunes to after its rescan.

During registration in the newly accessed system 128, the system 128 and mobile station 125 determine if the mobile station can operate according to local control features supported by system 128. The system 128 compares the MFR code and the 17-bit serial number in the mobile station's ESN received from the mobile station 125, in the registration access message, with the MFR codes and associated serial number ranges contained in its local control list. The local control list may be contained in a memory in MSC2. It also may be contained in other MSCs (not shown) within system 128. If the received MFR code matches a MFR code contained in the MFR code local control list and the 17-bit serial number is within the associated serial number range, the system 128 has an indication that the mobile station 125 supports the local control feature or features supported by the system. If, on the other hand, the registering mobile station's MFR code is not contained in the MFR code local control list, or the MFR code is contained in the list, but the 17-bit serial number is not within the associated serial number range, the system 128 has an indication that the mobile station 125 and system 128 do not support the common local control features.

If the registering mobile station 125 and the system 128 do not support common local control features, the system 128 sends a normal registration confirmation message to the mobile station 125 on the FOCC of base station 124. The mobile station 125 receives the registration confirmation message on the same FOCC and then stores the SID2, LOCAID2, REGID2, and REGINCR2 in its semi-permanent memory based upon the last values it received on the FOCC of base station 124. This normal registration confirmation message contains the same order code, order qualification code, and message type fields, as were contained in the mobile station's registration message. Upon receipt of the normal registration message from the newly accessed system, local control is not enabled in the mobile station 125, or system 128 as regards operation with mobile station 125.

If the registering mobile station 125 and system 128 support common local control features, the system 128 sends a local control registration confirmation message containing different order code, qualification code or message type code fields, instead of a normal registration confirmation message. The set of codes contained in the local control registration confirmation message will be as per agreement between the mobile station manufacturer and cellular system operator. FIGS. 5 and 6 illustrate possible sequences of registration access and special local control registration confirmation messages according to the first embodiment of the invention. FIG. 5 illustrates sequences for the IS-54-B and IS-136 systems, while FIG. 6 illustrates sequences for the EIA/TIA-553 system.

When registering mobile station 125 sends a registration access message and the system 128 has determined that the mobile station's MFR code is contained in the MFR code local control list for the system and the mobile station's ESN is within the serial number range associated with the MFR code, the system 128 will transmit the message shown in the right column as the local control registration confirmation message during the autonomous registration process. According to this first embodiment of the invention a standard audit message is transmitted by the system in place of the normal registration confirmation message defined by the system specification. For example, when the mobile station 125 sends a registration access message with a combination of order codes, order qualifying code and message type indicating "Autonomous Registration-Make Whereabouts Known, Authentication Word C Included," the system 128 will return an audit message addressed to the mobile station as the local control registration confirmation message. The audit message contains an order code, qualification code, and/or message type fields that differ, as indicated in FIGS. 5 and 6, from the normal expected registration confirmation message order code, qualification code, and message type fields.

Software within mobile station 125 expecting a registration confirmation message recognizes the audit message received in place of the normal registration confirmation message through the differing codes. This serves as an indication to the software that the system 128 supports local control features which are also supported by mobile station 125. The mobile station 125 will accept this audit message as it would a normal registration confirmation message that confirms registration and stores SID2, LOCAID2, REGID2 and REGINCR2 in semi-permanent memory. The mobile station 125 will also enable the local control function and then be able to accept local control messages in system 128, notwithstanding the fact that the group identification of its home SID does not match the group identification of the visited SID2.

Figure 7A:
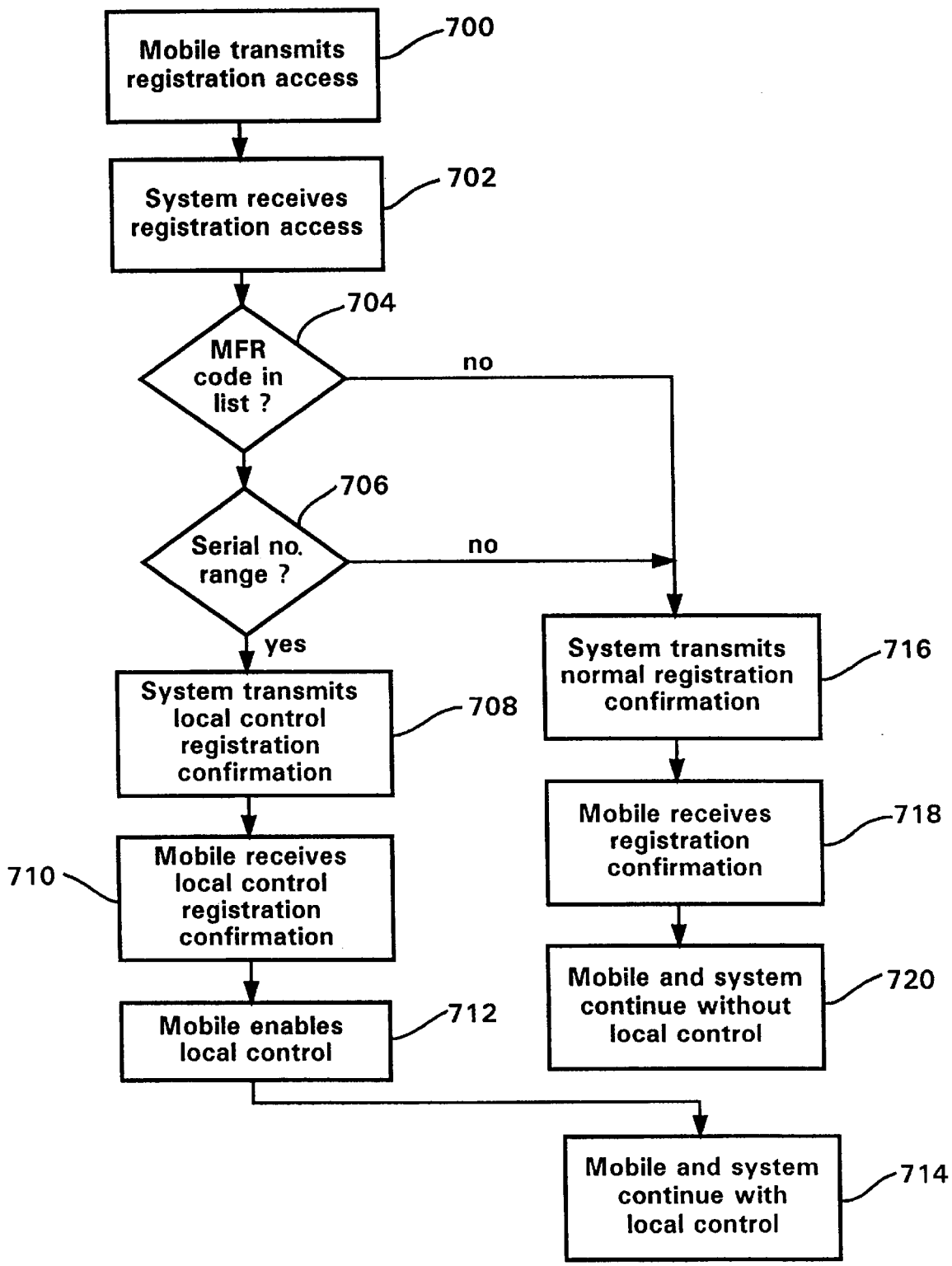
FIG. 7A is a flow diagram which illustrates the steps performed within the mobile station and system according to a first embodiment of the invention.

FIG. 7A is a flow diagram which illustrates the steps performed within the mobile station and system in accordance with the first embodiment of the invention. The process of FIG. 7A will be described with reference to FIG. 4, with mobile station 125 moving into newly accessed visited system 128. The process begins at Step 700 when mobile station 125 transmits a registration access message to newly accessed system base station 124 on a RECC after having detected the new SID2, LOCAID2, REGID and REGINCR values on the OMT of the FOCC of base station 124. At Step 702 the registration access message is received by the system 128 and transferred to MSC2. The process then moves to Step 704. At Step 704 software within MSC2 compares the MFR code received in the registration access message with MFR codes contained in the system local control MFR code list stored in memory within MSC2. If, at Step 704, it is determined that the received MFR code is not contained in the system MFR code local control list, the process moves from Step 704 to Step 716. At Step 716 MSC2 instructs the base station 124 to transmit a normal registration confirmation message back to the mobile 125 on the FOCC. This normal registration confirmation message is then received by the mobile station 125 at Step 718. From Step 718 the process then moves to Step 720 where the mobile station 125 and visited system 128 continue interaction in the normal manner without local control activated.

If, however, at Step 704, it is determined that the received MFR code is contained in the local control MFR code list stored in the MSC the process will move to Step 706. At Step 706 software within MSC2 compares the 17-bit serial number of the mobile station's ESN, that was received in the registration access message, with the associated serial number range stored along with the MFR code in the local control MFR code list. If the 17-bit serial number of the ESN is not within the range associated with the MFR code, the process will move from Step 706 to Step 716. Steps 716, 718 and 720 will then be performed as described above, and the mobile and system will continue without local control. If, however, at Step 706, it is determined that the 17-bit serial number of the ESN is within the associated range of serial numbers stored along with the MFR code in the local control list, the process will move to Step 708. At Step 708 MSC2 instructs the newly accessed base station 124 to transmit an audit message as a local control registration confirmation message to the registering mobile station 125 on the FOCC. The mobile station 125 receives the audit message at Step 710, from Step 710 the process moves to Step 712. At Step 712 the mobile software recognizes the audit message codes as indicating a local control registration confirmation message and that signals local control feature compatibility. Software within mobile station 125 then enables the local control function. From Step 712 the process will then move to Step 714 where the mobile station 125 and system 128 continue interaction in the normal manner with the local control function enabled and available for use by the mobile station 125 in newly entered visited system 128.

While the first embodiment of the invention is shown for use in all autonomous registration, i.e., upon registration prompted by the detection of a new SID or new LOCAID, or calculation of a new REGID, an alternative of the first embodiment would be to implement the invention for use only during selected types of registration.

For example, the process could be designed to be used only when a new SID was detected, i.e., only when a mobile station was registering for the first time in a newly accessed system. This alternative would accomplish the intended function of the invention, since the local control area of a system would usually be identified by one SID. Using the first embodiment for all autonomous registration however adds redundancy to the local control enhancement feature.

A further alternative would be to use the MFR code without the serial number range check. This would simplify the algorithm and have an advantage when all mobile stations built with a given MFR code support the same local control features. However, since it would be possible that a mobile station manufacturer could manufacture different models of mobile stations, some of which contained the local control enhancement feature and some of which did not contain the feature, it is possible that not all mobile stations would recognize the local control registration. In this case, particular mobile station models of a manufacturer whose MFR code was contained in a system's local control list, but did not support the local control feature of a newly accessed system would ignore the audit message, and interpret the absence of a registration order confirmation message as a registration failure. As in a conventional system, the mobile station would then attempt to re-register. In this alternative of the first embodiment of the invention, the system software in the MSC would interpret a re-registration attempt by the mobile station after the transmission of an audit message to the mobile in response to a registration message, as an indication that even though mobile's MFR code is contained in the local control list, the mobile is not capable of supporting the local control feature supported by the system. The system could identify the mobile as re-registering through the mobile station's MIN or ESN, which are contained in the registration access messages. The system would then register the mobile station. A normal registration confirmation message would then be transmitted to the mobile station and the mobile station would function in the system without local control.

Figure 7B:
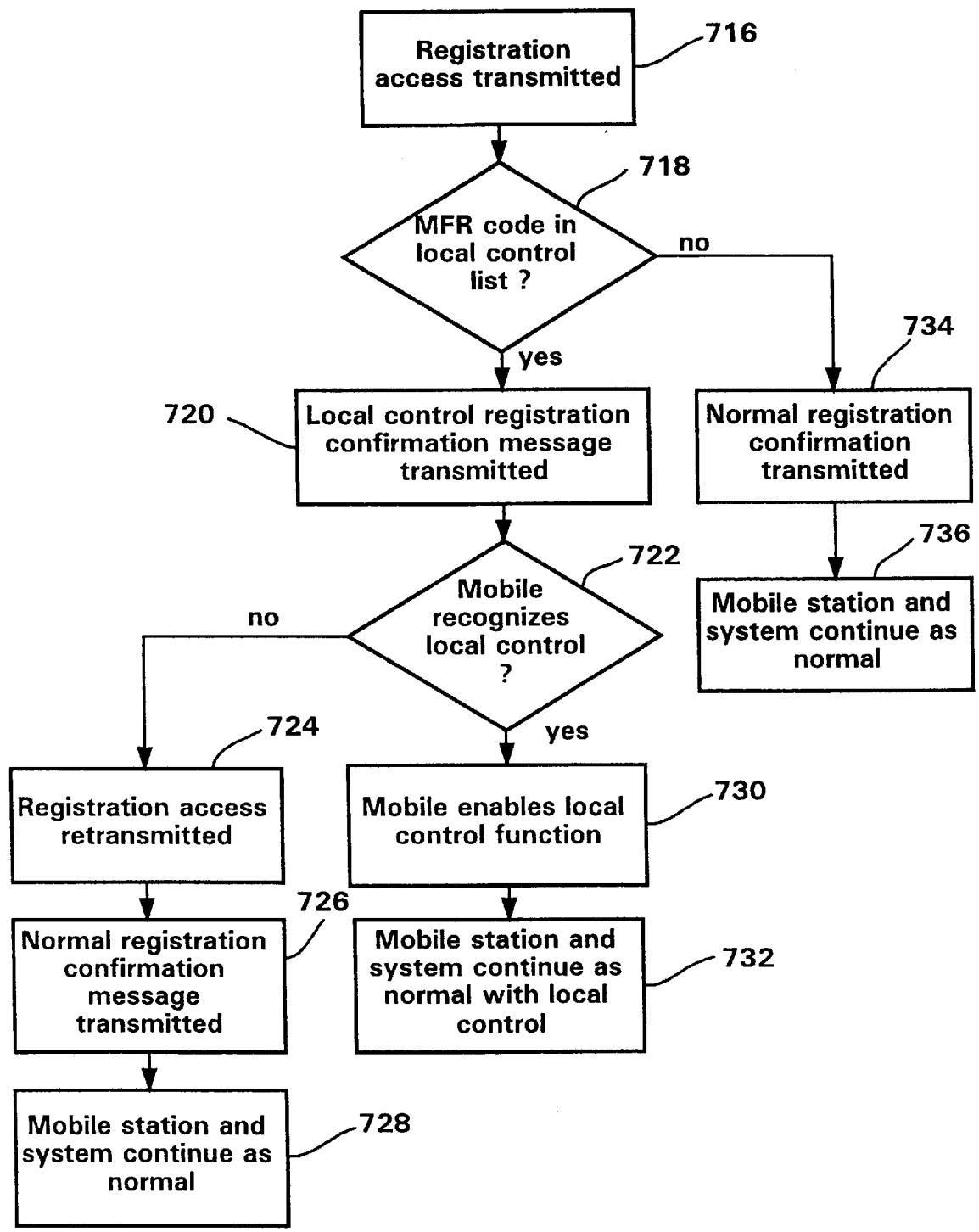
FIG. 7B is a flow diagram which illustrates the steps performed within the mobile station and system according to an alternative of the first embodiment of the invention.

FIG. 7B is a flow diagram which illustrates the steps performed within the mobile station and system in accordance with this alternative of the first embodiment of the invention, when a single manufacturer's code is allocated to each manufacturer. If the local control features supported by a manufacturer's mobile stations are supported by the system, the manufacturer's MFR code will be placed in the system MFR code local control list regardless as to whether or not all models of mobile stations made by that manufacturer support those local control features. The process of FIG. 7B will be described with reference to FIG. 4, with mobile station 125 moving into newly accessed visited system 128. The process begins at Step 716 when mobile station 125 transmits a registration access message to newly accessed system base station 124 on a RECC after having detected the new SID2, LOCAID2, REGID and REGINCR values on the OMT of the FOCC of base station 124. The process then moves to Step 718. At Step 718 MSC2 compares the MFR code received in the registration access message with MFR codes contained in the system local control MFR code list stored within MSC2. If, at Step 718, it is determined that the received MFR code is not contained in the system MFR code local control list, the process moves from Step 718 to Step 734. At Step 734 MSC2 instructs the base station 124 to transmit a normal registration confirmation message back to the mobile 125 on the FOCC. From Step 734 the process then moves to Step 736 where the mobile station 125 and visited system 128 continue interaction in the normal manner without local control activated.

If, however, at Step 718, it is determined that the received MFR code is contained in the local control MFR code list stored in the MSC. The system 128 has an indication that mobile station 125 supports common local control features. From Step 718 the process will move to Step 720. At Step 720 MSC2 instructs the newly accessed system base station 124 to transmit an audit message as a local control registration confirmation message to the registering mobile station 125 on the FOCC. The mobile station 125 receives the audit message and at Step 722 determines what type of registration confirmation message has been sent by examining the order code, order qualification code and/or the message type fields. If the mobile software recognizes the audit message codes as indicating a local control registration confirmation message that signals local control feature compatibility, the process will move to Step 730 where software within mobile station 125 then enables the local control function. From Step 730 the process will then move to Step 732 where the mobile station 125 and system 128 continue interaction in the normal manner with the local control function enabled and available for use by the mobile station 125 in newly entered visited system 128.

If however, at Step 722, the mobile station 125 does not recognize the codes contained in the audit message as indicating local control feature compatibility, the mobile station 125 does not support the local control functions of the system and the process will move to Step 724. At Step 724, the mobile station 125 will retransmit the registration access message. At Step 726 the newly accessed system 128 receives this second registration access message at base station 124, sent after an audit message had been sent to the same mobile station 125, in response to a first registration access message. System software recognizes that this is the second attempt of registration by mobile station 125 by comparing the MIN and ESN in the second registration access message with the MIN and ESN received in the first registration access message and saved in memory with the system. The system 128 now returns a normal registration confirmation message at Step 726. From Step 726 the process moves to Step 728. At Step 728 the mobile sation 125 and system 128 continue interaction in the normal manner without local control activated.

In a second embodiment of the invention, system software accesses a local control class of service rather than use a local control list. The local control class of service data is stored in the subscriber's profile contained within the HLR of each mobile station. FIG. 8 illustrates possible local control class of service values stored in the subscriber profile according to the second embodiment of the invention. Each local control class of service 800 value has an associated list of SID values 802 identifying systems which support this local control class of service. The SID values 802 each identify systems belonging to a common local control group, and supporting the particular local control class of service with which the SIDs are associated. Value 0 for the class of service 804 indicates that the mobile station does not support local control. Value 1 for the class of service 806 indicates that the mobile supports local control for a certain local control feature (type 1). The SID values SID1, SID2, SID3 and SID4 associated with the type 1 value belong to the common local control group for the type 1 local control feature. Additional values for class of service, such as, for example, value 2 for the class of service of 808, could be used if a mobile station supported differing local control features which were supported by different systems.

In accordance with the second embodiment of the invention, the step of sending a local control registration confirmation message as a reply to the registration access message is replaced by the system sending a normal registration confirmation message to the registering mobile station. After registering a mobile station, the system verifies a local control class of service contained in the subscriber's profile stored within the HLR. If the class of service for the particular local control feature is verified, the system pages the mobile station and assigns it to a voice channel. The mobile station then tunes to the voice channel designated in the voice channel assignment message. When the mobile station has tuned to the designated voice channel, a local control message is sent to the registering mobile on that voice channel. While the mobile station may not be a priori ready to accept local control messages for the current system and the SID value of this system, the transmission of the local control message on the assigned voice channel at this point in the sequence is a trigger that enables software within the mobile station to accept local control messages in this system.

In EIA/TIA-553, IS-54 and IS-136 systems, the local control message on the analog voice channel is identified by a specific order code (11110) and order qualifier code (000). The message type field, comprising five bits and defined as the local field, is not specified and is left to the system and mobile station manufacturers choice. In the second embodiment of the invention this five bit message type field is assigned to indicate the number of additional words following the first word of a local control message. Each additional word includes the SID value identifying a system which supports the same local control features of the newly accessed system. The SID values received in these additional words are stored in the mobile station as a definition of systems which support local control features common with the local control features of the current system. The additional words comprise a list of the SIDS of systems contained in the common local control group of the class of service illustrated in FIG. 8. Upon registering in any of the systems the mobile station will check the stored common local control list and determine that the mobile station may use the same common local control feature.

Figure 9:
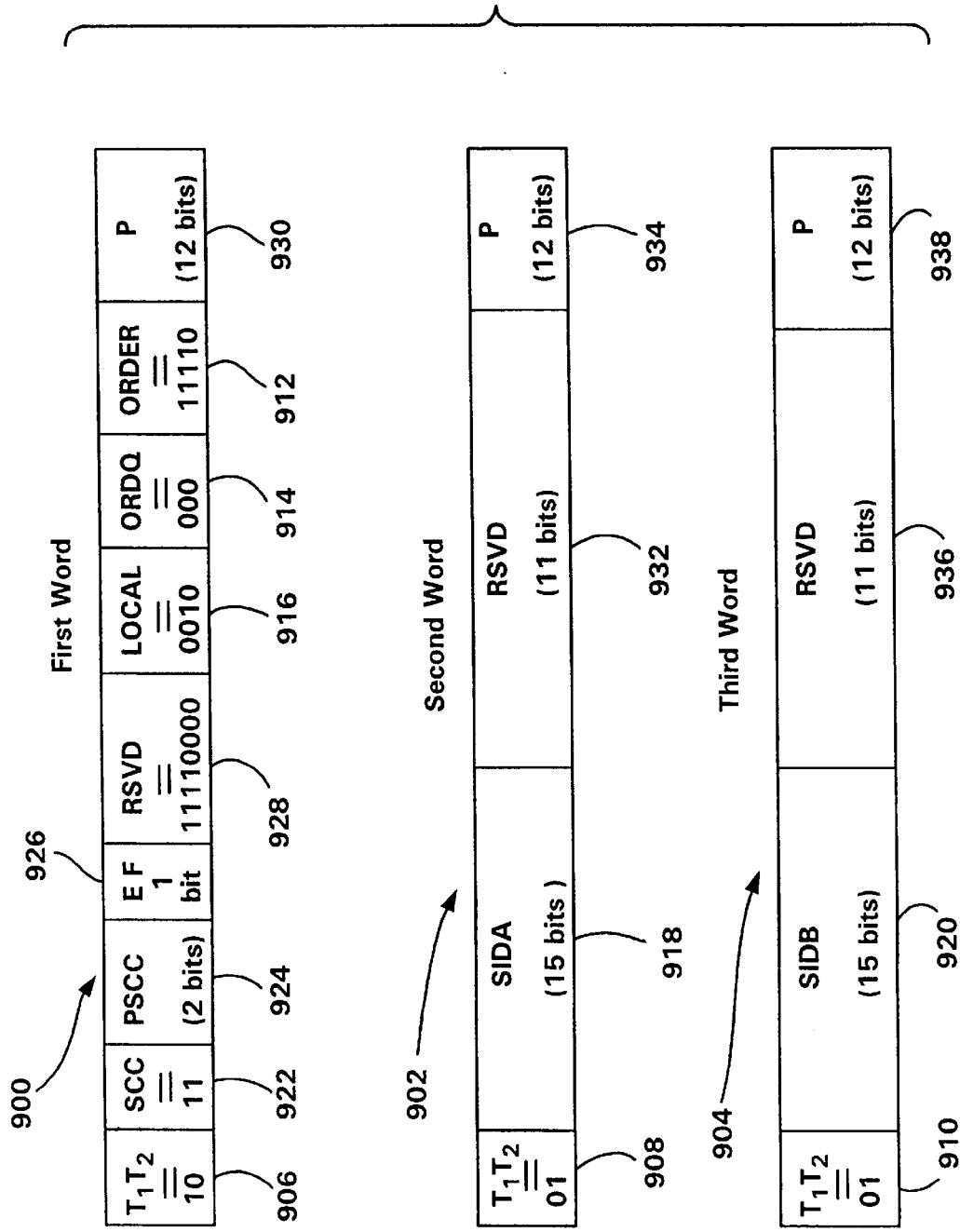
FIG. 9 illustrates the format of the local control message sent on the voice channel in response to a registration access according to a second embodiment of the invention.

FIG. 9 illustrates the format of the binary words contained in the local control message sent on the voice channel in response to a registration access, according to the second embodiment of the present invention. The local control message illustrated comprises three words 900, 902 and 904. The $T_1T_2$ field 906 of the first word 900 is set to 10 to identify it as the first word in the message. The $T_1T_2$ fields 908 and 910, of the second word 902 and the third word 904 are each set to 01 identify these words as additional words. The ORDER field 912 and ORDQ field 914 of the first word are set to 11110 and 000, respectively, to identify the message as a local control message.

In accordance with the invention, the LOCAL field 916 is set to 0010 in FIG. 9 to indicate that two additional words are contained in the local control message. The first word 900 also contains SCC field 922 and PSCC field 924. These fields are used for control channel selection and control. Each of the first word, second word and third word also contain a RSVD field 928, 932 and 936, respectively, and P field 930, 934 and 938, respectively. The RSVD fields are reserved in the specifications for future use. The IS-136 and IS-54B systems also include a EF field 926 in the first word. In EIA/TIA -553 systems the EF bit is contained in the RSVD field 928. The P fields 930, 934 and 938 are used for parity error control. The second word 902 and third word 904 contain SIDA 918 and SIDB 920, respectively, each of which indicates a SID value for a system which is part of a common local control group.

In the second embodiment of the invention the RSVD field 928 may be set to a value agreed upon by system and mobile manufacturers to add redundancy to the identification of the voice channel messages as a local control message. In FIG. 9 RSVD field 928 has been set to agreed upon value of 11110000. This adds to the accuracy of identifying the first word of the local control message as indicating local control capacity. The memory space allocated for the list in the mobile station is large enough so that all SID values that would be used by a cellular system in a network covering a large metropolitan area could be contained in the list.

The newly accessed cellular system also stores the identity of each currently registered mobile station to which it has transmitted the local control message containing the list of SID values of systems contained in a common local control group. The newly accessed system also sets a group flag in the subscriber profile of the mobile station in the mobile station's HLR, to indicate that the mobile station is registered with a system in the common local control group of the newly accessed system. As the mobile station periodically reregisters in the newly accessed system, the newly accessed system checks to determine if the mobile station is previously registered. If the mobile station has been previously registered, the system does not reiterate the local control enhancement procedure. As the mobile station moves into a second system in the common local control group, the second system checks the group flag in the subscriber profile of the mobile station in the mobile station's HLR. If the flag is set indicating that the mobile is presently registered with a system in the local control group, the second system does not reiterate the local control enhancement procedure during registration of the mobile station.

Figure 10:
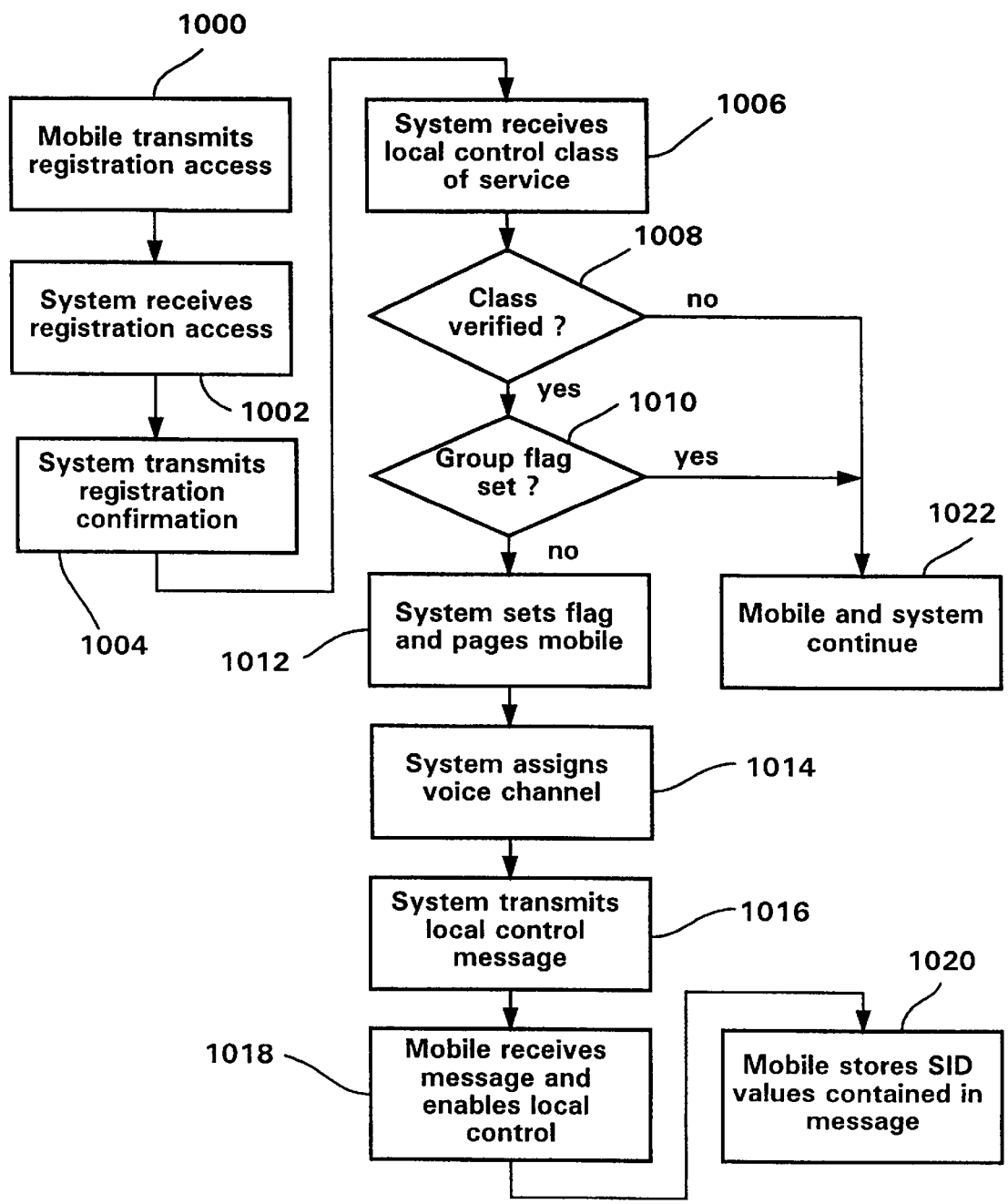
FIG. 10 is a flow diagram which illustrates the steps performed within the mobile station and system according to a second embodiment of the invention.

FIG. 10 is a flow diagram which illustrates the steps performed by software within the mobile station and system in accordance with the second embodiment of the invention. The process of FIG. 10 will be described with reference to FIG. 4 with mobile station 125 moving into newly accessed visited system 128. The process begins at Step 1000 when mobile station 125 transmits a registration access message to newly accessed system base station 124 on the RECC of base station 124 after having detected the new SID2, LOCAID2, REGID and REGINCR on the OMT values of the FOCC of base station 124. At Step 1002, the system receives the registration access message and the registration message is relayed to MSC2. From Step 1002 the process then moves to Step 1004. At Step 1004, the system 128 transmits a normal registration confirmation message to the mobile station 125. After transmitting the normal registration confirmation message, the process then moves to Step 1006. At Step 1006, MSC2 accesses the local control class of service data contained within the subscriber profile of mobile station 125 stored in HLR 126. At Step 1008, system verifies the local control class of service for local control features supported by the system. If the local control class of service is not verified, the process moves to Step 1022, where the system 128 and mobile station 125 continue in the normal manner without local control. If, however, the local control class of service is verified by the system 128, the system 128 has an indication that mobile station 125 supports the common local control features and the process will move to Step 1010. At Step 1010 the software within MSC2 of newly accessed system 128 checks a group flag contained in the subscriber profile retrieved from the HLR 126 of mobile station 125. If the group flag is set, the mobile station has previously registered with a system which is part of the common local control group, containing system 128, which support common local control features. If it has previously registered, the mobile station 125 will have acquired the newly accessed system SID2, through the local control message as described above, when registering in a previous system which is part of the common local control group. Software within the mobile station 128 would have already enabled the local control function upon detecting SID2 on the OMT of base station 124. The process will then move from Step 1010 to Step 1022. At Step 1022, the mobile continues in the normal manner with local control enabled.

If, however, the mobile station 125 has not previously registered in the common local control group to which system 128 belongs, the process will move from Step 1010 to Step 1012. At Step 1012, system software sets the group flag in the subscriber profile indicating that mobile station 125 has registered with a system of the common local control group associated with the common local control features and pages mobile station 125. From Step 1012 the process will then move to Step 1014. At Step 1014 the newly accessed system base station 124 transmits a voice channel assignment message on the FOCC, assigning a voice channel to the registering mobile station 125. From Step 1014, the process moves to Step 1016. At Step 1016, MSC2 orders base station 124 to transmit a local control message to the mobile station 125 on the assigned voice channel. This local control message contains the additional word fields containing the SID values of the other systems belonging to the common local control group to which system 128 belongs. From. Step 1016 the process moves to Step 1018. At Step 1018 the mobile station 125 receives the local control message. While a mobile station built according to EIA-553, IS-54B, or IS-136 standards may not have been a priori ready to accept local control messages for the current system, the transmission of the local control message on the assigned voice channel at this point in the process is a trigger that indicates to mobile station 125 the system 128 supports common local control features. From step 1018, the process then moves to Step 1020. At Step 1020, mobile station 125 stores the list of SID values received in the additional words of the local control message. The mobile station 125 can now move within the systems belonging to the larger network of systems while having an indication that each of these systems supports the common local control features.

In an alternative of the second embodiment of the invention, the voice channel assignment message is transmitted as the registration confirmation message after the local control class of service is verified. The voice channel assignment message transmitted in place of the registration confirmation message serves as an indication to the mobile that the mobile station and system support common local control features. This alternative does not require that a page message be used. This alternative requires that an MSC access the subscriber profile in a registering mobile station's HLR and verify the local control class of service quickly enough so that a voice channel assignment message, or normal registration confirmation message, can be transmit before the mobile station times out and attempts to reregister. This is possible, for example, in systems operating according to the EIA/TIA IS-41 Cellular Radiotelecommunications Intersystem Operations Specification, and using Signaling System number 7 protocols, without global title translation, for intersystem communication.

Figure 11:
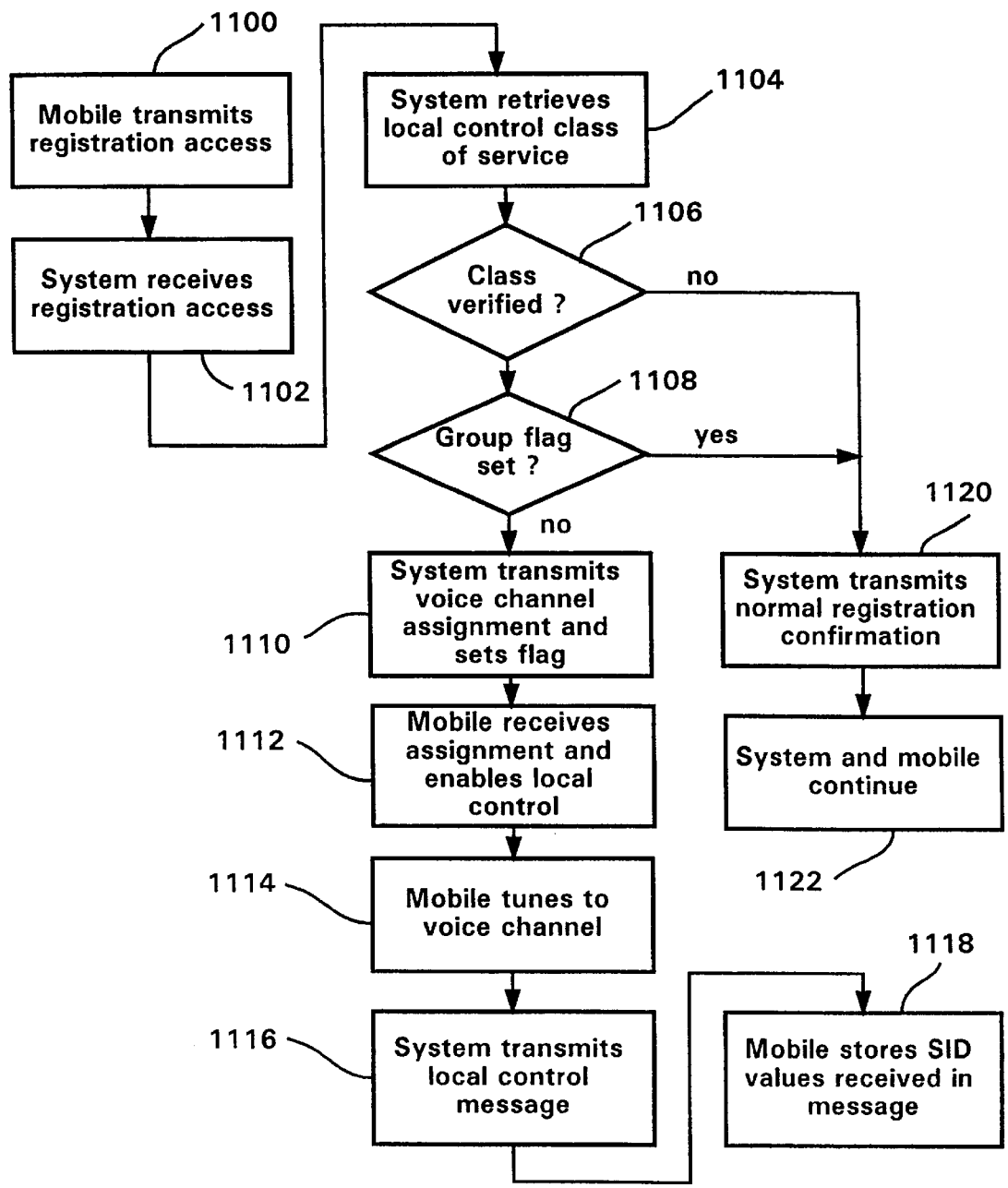
FIG. 11 is a flow diagram which illustrates steps performed within the mobile station and system according to an alternative of a second embodiment of the invention.

FIG. 11 is a flow diagram which illustrates steps performed in accordance with the above discussed alternative of the second embodiment of the invention. The process of FIG. 11 will be described with reference to FIG. 4, with mobile station 125 moving into newly accessed visited system 128. The process begins at Step 1100 when a mobile station 125 transmits a registration access message to a newly accessed system base station 124 on the RECC after having detected the new SID2, LOCAID2, REGID and REGINCR values on the OMT of the FOCC at base station 124. At Step 1102, the system 128 receives this registration message. From Step 1102 the process moves to Step 1104.

At Step 1104, MSC2 accesses the local control class of service data contained within the subscriber profile of mobile station 125 stored in HLR 126. At Step 1106, the system verifies the local control class of service for local control features supported by the system 128. If the local control class of service is not verified, the process moves to Step 1120, where a normal registration confirmation is sent. The process then moves to Step 1122 where the system 128 and mobile station 125 continues in the normal manner without local control.

If, however, the local control class of service is verified by system 128, the process will move to Step 1108. At Step 1108 the newly accessed system checks the group flag contained in the subscriber profile retrieved from HLR 126 of mobile station 125. If the group flag is set, the mobile station has previously registered with a system in the common local control group containing system 128. If it has previously registered, the mobile station 125 will have acquired the newly accessed system SID2, through the local control message, as described above, when registering in a system which is part of the common local control group. There is no need to reiterate the local control capabilities of the system to the mobile station. Software within the mobile station 125 would have enabled the local control function upon detecting SID2 on the OMT of base station 124. If the group flag is set, this is the case and the process will then move to Step 1120 where a normal registration confirmation is sent. The process then moves to Step 1122 where the system 128 and mobile station 125 continue in the normal manner with local control enabled.

If, however, at Step 1108, it is found that the flag is not set, the process continues to Step 1110. At Step 1110 the system 128 transmits a voice channel assignment to mobile station 125 as the local control registration confirmation message and sets the group flag in the local control class of service data in the subscriber's profile. From Step 1110 the process with then moves to Step 1112. At Step 1112 mobile station 125 receives the voice channel assignment message. Mobile station 125 recognizes the voice channel assignment message as indicating local control compatibility and enables local control. From Step 1112, the process then moves to Step 1114 where mobile station 125 tunes to the assigned voice channel. The process then moves from Step 1114 to 1116. At Step 1116 the system 128 transmits a local control message to mobile station 125 on the voice channel. This local control message contains the additional word fields that contain the SID values of systems, belonging to the common local group to which system 128 belongs. From Step 1116 the process moves to Step 1118, where the mobile station receives the local control message and stores the received SID values in memory. The mobile station 125 can now move within the systems belonging to the larger network of systems while having an indication that each of these systems supports common local control features.

As can be seen from the above description, the invention allows a mobile station to roam among various systems while the mobile station and visited system are each provided with an indication that common local control features are provided by the mobile station and visited system. The invention enhances the performance of mobile stations and systems into which it is implemented, by allowing local control to be used in a visited system which does not contain the mobile station's group identification in its SID. This results in a more efficient system with subscribers receiving the full benefits of the local control features allowed by system specification.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. In a mobile telecommunications system, a method of supporting local control functionality independent of mobile station roaming status, said method comprising the steps of:

receiving in said system a registration message transmitted from a mobile station, said registration message comprising at least one identification code for determining local control features supported by said mobile station, wherein said local control features are customizations of air interfaces to provide special local services within said system;

determining from said registration message whether said mobile station supports one or more of said local control features also supported by said system; and responsive to the determination:

transmitting a first type registration confirmation message to said mobile station if said local control features are not supported; and transmitting a second type registration confirmation message to said mobile station if said local control features are supported.

2. The method of claim 1 in which said registration message transmitted from a mobile station comprises a first identification code and a second identification code, and, further, in which the step of determining comprises the steps of:

determining if said first identification code is contained in a list stored by said system; and determining if said second identification code is within a stored range of values associated with said first identification code.

3. The method of claim 2 in which said first identification code comprises a manufacturer code and said second identification code comprises a mobile station serial number.

4. The method of claim 1 in which said step of determining further comprises the step of determining if said at least one identification code is contained in a list stored by said system.

5. The method of claim 4 in which said stored list comprises a list of manufacturer codes.

6. The method of claim 5 in which said manufacturer codes identify manufacturers of mobile stations which support one or more local control features supported by said system.

7. The method of claim 5 in which said manufacturer codes identify models of mobile stations which support one or more local control features supported by said system.

8. The method of claim 1 in which said second type registration confirmation message comprises an initial message assigning a voice channel for communications between said system and said mobile station.

9. The method of claim 8 further comprising the steps of transmitting a local control message on said voice channel, said local control message comprising a data field.

10. The method of claim 9 in which said data field comprises one or more system identification values, said system identification values identifying neighboring systems which support one or more local control features common with one or more local control features supported by said system.

11. The method of claim 10 further comprising the step of setting a common local control group flag in a home location register for said mobile station.

12. The method of claim 8 in which said step of determining comprises the steps of:

accessing a home location register for said mobile station; and verifying a local control class of service stored in said home location register.

13. The method of claim 12 in which said step of verifying further comprises the step of determining if a common local group flag contained in said data base is set.

14. The method of claim 1 further comprising the steps of:

receiving in said system a second registration message transmitted from said mobile station;

determining whether said second registration message was received after having previously transmitted a second type registration confirmation message to said mobile station; and responsive to an affirmative determination:

transmitting said first type registration confirmation message to said mobile station.

15. In a mobile telecommunications system, a method of supporting local control functionality independent of mobile station roaming status, said method comprising the steps of:

receiving in said system a registration message transmitted from a mobile station, said registration message comprising at least one identification code;

determining from said registration message whether said mobile station supports one or more local control features also supported by said system; and responsive to the determination:

transmitting a page message to said mobile station if local control features are supported;

assigning a communications channel for communications between said system and said mobile station; and transmitting a local control message on said assigned communications channel to said mobile station, and local control message comprising a data field, wherein said data field comprises one or more system identification values, said system identification values identifying neighboring systems which support one or more local control features common with one or more local control features supported by said system.

16. In a mobile telecommunications system, an apparatus for supporting local control functionality independent of mobile station roaming status, said apparatus comprising:

means for receiving in said system a registration message transmitted from a mobile station, said registration message comprising at least one identification code for determining local control features supported by said mobile station, wherein said local control features are customizations of air interfaces to provide special local services within said system;

means for determining from said registration message whether said mobile station supports one or more of said local control features also supported by said system; and means for transmitting a first type registration confirmation message to said mobile station if said local control features are not supported; and means for transmitting a second type registration confirmation message to said mobile station if said local control features are supported.

17. The apparatus of claim 16 in which said registration message transmitted from a mobile station comprises a first identification code and a second identification code, and, further, in which said means for determining comprises:

means for determining if said first identification code is contained in a list stored by said system; and means for determining if said second identification code is within a stored range of values associated with said first identification code.

18. The apparatus of claim 17 in which said first identification code comprises a manufacturer code and said second identification code comprises a mobile station serial number.

19. The apparatus of claim 16 in which said means for determining further comprises means for determining if said at least one identification code is contained in a list stored by said system.

20. The apparatus of claim 19 in which said stored list comprises a list of manufacturer codes.

21. The apparatus of claim 20 in which said manufacturer codes identify manufacturers of mobile stations which support one or more local control features supported by said system.

22. The apparatus of claim 20 in which said manufacturer codes identify manufacturers of mobile stations which support one or more local control features supported by said system.

23. The apparatus of claim 17 in which said second type registration confirmation message comprises an initial message assigning a voice channel for communications between said system and said mobile station.

24. The apparatus of claim 17 further comprising the steps of transmitting a local control message on said voice channel, said local control message comprising a data field.

25. The apparatus of claim 24 in which said data field comprises one or more system identification values, said system identification values identifying neighboring system which support one or more local control features common with one or more local control features supported by said system.

26. The apparatus of claim 25 further comprising means for setting a common local control group flag in a home location register for said mobile station.

27. The apparatus of claim 23 in which said means for determining comprises:

means for accessing a home location register for said mobile station; and means for verifying a local control class of service stored in said home location register.

28. The apparatus of claim 27 in which said means for verifying further comprises means for determining if a common local group flag stored in said home location register is set.

29. The apparatus of claim 16 further comprising:

means for receiving in said system a second registration message transmitted from said mobile station;

means for determining whether said second registration message was received after having previously transmitted a second type registration confirmation message to said mobile station; and means for transmitting said first type registration confirmation message to said mobile station in response to an affirmative determination.

30. In a mobile telecommunications system, an apparatus for supporting local control functionality independent of mobile station roaming status, said apparatus comprising:

means for receiving in said system a registration message transmitted from a mobile station, said registration message comprising at least one identification code;

means for determining from said registration message whether said mobile station supports one or more local control features also supported by said system;

means for transmitting a page message to said mobile station if local control features are supported;

means for assigning a communications channel for communications between said system and said mobile station; and means for transmitting a local control message on said assigned communications channel to said mobile station, said local control message comprising a data field, wherein said data field comprises one or more system identification values, said system identification values identifying neighboring systems which support one or more local control features common with one or more local control features supported by said system.

31. In a mobile telecommunications system, an apparatus for supporting local control functionality independent of mobile station roaming status, said apparatus comprising:

means for receiving in said system a registration message transmitted from a mobile station, said registration message comprising at least one identification code;

means for determining from said registration message whether said mobile station supports one or more local control features also supported by said system, wherein said means for determining includes:

means for accessing a home location register for said mobile station; and means for verifying a local control class of service contained in said home location register;

means for transmitting a page message to said mobile station if local control features are supported;

means for assigning a communications channel for communications between said system and said mobile station; and means for transmitting a local control message on said assigned communications channel to said mobile station, said local control message comprising a data field.

32. In a mobile telecommunications system, a method of supporting local control functionality independent of mobile station roaming status, said method comprising the steps of:

receiving in said system a registration message transmitted from a mobile station, said registration message comprising at least one identification code;

determining from said registration message whether said mobile station supports one or more local control features also supported by said system, wherein said step of determining includes the steps of:

accessing a home location register for said mobile station; and verifying a local control class of service contained in said home location register; and responsive to the determination:

transmitting a page message to said mobile station if local control features are supported;

assigning a communications channel for communications between said system and said mobile station; and transmitting a local control message on said assigned communications channel to said mobile station, and local control message comprising a data field.

* * * * *